(12) United States Patent
Yamasaki et al.

(10) Patent No.: US 9,876,229 B2
(45) Date of Patent: Jan. 23, 2018

(54) LITHIUM SECONDARY BATTERY AND MANUFACTURING METHOD OF THE SAME

(71) Applicant: TOYOTA JIDOSHA KABUSHIKI KAISHA, Toyota-shi, Aichi-ken (JP)

(72) Inventors: Hiroshi Yamasaki, Nagoya (JP); Tatsuya Hashimoto, Osaka (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 8 days.

(21) Appl. No.: 15/082,662

(22) Filed: Mar. 28, 2016

(65) Prior Publication Data

US 2016/0293941 A1 Oct. 6, 2016

(30) Foreign Application Priority Data

Mar. 31, 2015 (JP) .................. 2015-073202

(51) Int. Cl.
*H01M 4/587* (2010.01)
*H01M 4/133* (2010.01)
*H01M 10/052* (2010.01)
*H01M 10/0567* (2010.01)
*H01M 4/02* (2006.01)

(52) U.S. Cl.
CPC .......... *H01M 4/587* (2013.01); *H01M 4/133* (2013.01); *H01M 10/052* (2013.01); *H01M 10/0567* (2013.01); *H01M 2004/021* (2013.01); *H01M 2004/027* (2013.01); *H01M 2220/20* (2013.01); *Y02E 60/122* (2013.01); *Y02P 70/54* (2015.11)

(58) Field of Classification Search
CPC ............... H01M 4/587; H01M 10/052; H01M 10/0567; H01M 4/133; H01M 2004/021; H01M 2004/027; H01M 2220/20; Y02P 70/54; Y02E 60/122
See application file for complete search history.

(56) References Cited

U.S. PATENT DOCUMENTS

2009/0029252 A1 1/2009 Nakai et al.
2009/0050841 A1* 2/2009 Sasaki .................. H01M 4/505
 252/182.1
(Continued)

FOREIGN PATENT DOCUMENTS

CN 103560276 A 2/2014
JP 2009-026691 A 2/2009
(Continued)

*Primary Examiner* — Cynthia K Walls
(74) *Attorney, Agent, or Firm* — Sughrue Mion, PLLC

(57) ABSTRACT

A manufacturing method of the invention includes: a process of preparing a positive electrode which includes a positive electrode mixture layer, a negative electrode which includes a negative electrode mixture layer, and a non-aqueous electrolyte; and a process of accommodating the positive electrode, the negative electrode, and the non-aqueous electrolyte in a battery case. The non-aqueous electrolyte contains lithium sulfate. In addition, when a BET specific surface area of the negative electrode mixture layer is referred to as X ($m^2/g$) and an addition amount of the lithium sulfate with respect to a total amount of the non-aqueous electrolyte is referred to as Y (mass %), the following relationships are satisfied:

$3 \leq X \leq 4.3$;

$0.02 \leq Y \leq 0.1$; and $Y/X \leq 0.023$.

4 Claims, 1 Drawing Sheet

(56) References Cited

U.S. PATENT DOCUMENTS

2012/0308881 A1  12/2012  Tokuda et al.
2013/0280622 A1  10/2013  Tokuda et al.

FOREIGN PATENT DOCUMENTS

| JP | 2011-187440 A | 9/2011 |
| JP | 2012-094454 A | 5/2012 |
| JP | 2013-152956 A | 8/2013 |

\* cited by examiner

LITHIUM SECONDARY BATTERY AND MANUFACTURING METHOD OF THE SAME

INCORPORATION BY REFERENCE

The disclosure of Japanese Patent Application No. 2015-073202 filed on Mar. 31, 2015 including the specification, drawings and abstract is incorporated herein by reference in its entirety.

BACKGROUND OF THE INVENTION

1. Field of the Invention

The invention relates to a lithium secondary battery, and more particularly to a lithium secondary battery which can be applied to a vehicle-mounted power source, and a manufacturing method of the same.

2. Description of Related Art

In a lithium secondary battery, a portion of a non-aqueous electrolyte is decomposed during initial charging such that a protective film (solid electrolyte interface film (SEI film)) containing the decomposed matter is formed on the surface of a negative electrode. The interface between the negative electrode and the non-aqueous electrolyte is stabilized by the SEI film and thus the durability (for example, cycle characteristics) of the battery can be enhanced. As documents in the related art, there are Japanese Patent Application Publication No. 2011-187440 (JP 2011-187440 A) and Japanese Patent Application Publication No. 2009-026691 (JP 2009-026691 A). For example, in JP 2011-187440 A, it is described that a fluoro salt as an additive is included in a non-aqueous electrolyte to form an SEI film containing components derived from the fluoro salt on the surface of a negative electrode, and thus the durability of a battery can be enhanced.

However, according to the investigations by the inventors, in a case where the above-described technique is applied to a battery (for example, in-vehicle battery) that requires high input and output densities and a high capacity retention ratio over a long period of time, for example, over 10 years, there is still room for improvement. That is, the SEI film may deteriorate or peel off from the surface of the negative electrode while the battery is continuously used, and thus it is difficult to maintain a stable SEI film over a long period of time. In addition, at a position at which the SEI film is deteriorated, a new SEI film is formed. At this time, typically, the non-aqueous electrolyte is consumed, and this may result in a reduction in battery capacity. Therefore, as the use period of the battery increases, there is a problem in that the resistance increases or the capacity retention ratio decreases. On the other hand, when designs for suppressing an increase in the resistance are employed, initial characteristics (for example, initial resistance) may be degraded. That is, it is difficult to make the initial characteristics and the durability of the battery be compatible with each other.

SUMMARY OF THE INVENTION

The invention provides a lithium secondary battery capable of maintaining and exhibiting excellent battery characteristics over a long period of time, and a manufacturing method of the same.

The inventors considered forming an SEI film having low resistance and high durability on the surface of a negative electrode. As a result of intensive investigations, the invention was completed. A first aspect of the invention relates to a manufacturing method of a lithium secondary battery. The manufacturing method includes: a process of preparing a positive electrode which includes a positive electrode mixture layer, a negative electrode which includes a negative electrode mixture layer, and a non-aqueous electrolyte; and a process of accommodating the positive electrode, the negative electrode, and the non-aqueous electrolyte in a battery case. The non-aqueous electrolyte contains lithium sulfate expressed by the following expression (I):

In addition, when a BET specific surface area of the negative electrode mixture layer is referred to as X (m²/g) and an addition amount of the lithium sulfate with respect to a total amount (100 mass %) of the non-aqueous electrolyte is referred to as Y (mass %), the following relationships are satisfied:

$3 \leq X \leq 4.3$;

$0.02 \leq Y \leq 0.1$; and $(Y/X) \leq 0.023$.

According to the above configuration, the effect of adding the lithium sulfate is sufficiently exhibited. That is, a good-quality SEI film containing components derived from the lithium sulfate is appropriately formed on the surface of the negative electrode. The SEI film may contain lithium ions ($Li^+$) as charge carriers, and components derived from sulfate ions ($SO_4^{2-}$) (for example, groups containing an S atom, such as a sulfonyl group and a sulfonyloxy group). Accordingly, an SEI film which has low resistance and high durability is realized, and thus the interface between the negative electrode and the non-aqueous electrolyte is highly stabilized. Therefore, a lithium secondary battery in which the initial battery characteristics are good and an increase in resistance and a reduction in capacity retention ratio are suppressed even after continuous use for a long period of time can be realized.

The negative electrode mixture layer may typically include a negative electrode active material, and the negative electrode active material may be graphite. A carbon-containing material such as graphite causes a small change in volume (expansion and contraction) during charging and discharging and thus has excellent durability compared to, for example, an oxide of lithium titanate or the like and a single substance or an alloy compound of a silicon material. Graphite has a hexagonal net structure having a high degree of orientation (degree of graphitization) and thus has a higher energy density among carbon-containing materials. Therefore, in the case where the negative electrode active material is graphite, the initial characteristics (for example, energy density) and the durability can be compatible with each other to a higher degree.

A second aspect of the invention relates to a lithium secondary battery including: a positive electrode which includes a positive electrode mixture layer; a negative electrode which includes a negative electrode mixture layer; a battery case which accommodates the positive electrode and the negative electrode; and a non-aqueous electrolyte which is accommodated in the battery case. The non-aqueous electrolyte (in other words, the non-aqueous electrolyte when accommodated in the battery case, and the same is applied throughout) accommodated in the battery case contains lithium sulfate. In addition, when a BET specific surface area of the negative electrode mixture layer is referred to as X (m$^2$/g) and an addition amount of the lithium sulfate with respect to a total amount (100 mass %) of the non-aqueous electrolyte accommodated in the battery case is referred to as Y (mass %), the following relationships are satisfied:

$3 \le X \le 4.3$;

$0.02 \le Y \le 0.1$; and $(Y/X) \le 0.023$.

In this configuration, the initial resistance can be suppressed to be low. In addition, excellent battery characteristics (for example, input and output densities or energy density) can be maintained and exhibited over a long period of time.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the appropriate drawings. In each of the drawings, the dimensional relationships (length, width, thickness, and the like) do not necessarily reflect actual dimensional relationships. In addition, items which are not items that are particularly mentioned in the specification and are necessary items for the implementation of the invention (general techniques related to the configuration of a battery, for example, the configuration and manufacturing method of an electrode body including a positive electrode and a negative electrode, the configuration and manufacturing method of a separator, and the shape of a battery (case)) can be recognized as design items by those skilled in the related art in the corresponding field. The invention can be implemented on the basis of the contents disclosed in the specification and general technical knowledge in the corresponding field.

Figure 1:
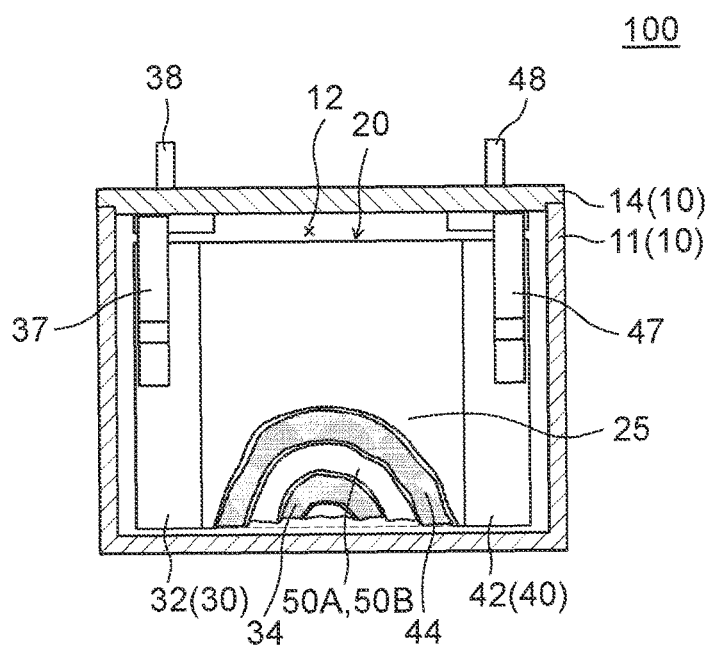
FIG. 1 is a schematic sectional view of a lithium secondary battery according to an embodiment.

FIG. 1 is a schematic sectional view of a lithium secondary battery according to an embodiment. A lithium secondary battery 100 illustrated in FIG. 1 includes a battery case 10, and a wound electrode body 20 accommodated in the battery case 10. The upper surface of a battery case body 11 of the battery case 10 has an opening 12, and the opening 12 is sealed by a cover 14 after the wound electrode body 20 is accommodated in the battery case 10 through the opening 12. In addition, in the battery case 10, a non-aqueous electrolytic solution 25 is accommodated. The cover 14 is provided with an external positive electrode terminal 38 and an external negative electrode terminal 48 for external connection, and portions of the terminals 38, 48 protrude toward the surface side of the cover 14. A portion of the external positive electrode terminal 38 is connected to an internal positive electrode terminal 37 in the battery case 10, and a portion of the external negative electrode terminal 48 is connected to an internal negative electrode terminal 47 in the battery case 10. The internal terminals 37, 47 are respectively connected to a positive electrode 30 and a negative electrode 40 included in the wound electrode body 20. The material of the battery case (including the cover) may be a metal material such as aluminum, or a resin material such as polyphenylene sulfide. The shape of the battery case is not particularly limited, and may be a rectangular parallelepiped shape, a cylindrical shape, or the like.

The wound electrode body 20 includes the positive electrode (positive electrode sheet) 30 having a long sheet shape and the negative electrode (negative electrode sheet) 40 having a long sheet shape. The positive electrode sheet 30 includes a long positive electrode current collector 32, and a positive electrode mixture layer 34 formed on at least one surface (typically, both surfaces) thereof. The negative electrode sheet 40 includes a long negative electrode current collector 42, and a negative electrode mixture layer 44 formed on at least one surface (typically, both surfaces) thereof. The wound electrode body 20 further includes two separators (separator sheets) 50A and 50B having a long sheet shape. The positive electrode sheet 30 and the negative electrode sheet 40 are laminated with the two separator sheets 50A and 50B interposed therebetween. The laminate is wound in a longitudinal direction and is formed in a flat shape. The electrode body is not limited to the wound electrode body, and appropriate shapes and configurations may be appropriately employed depending on the shape of the battery or purpose of use. Hereinafter, each of the constituent elements included in the lithium secondary battery will be described.

As the positive electrode current collector included in the positive electrode (for example, the positive electrode sheet) of the lithium secondary battery, as in the related art, a conductive member made of metal having good conductivity is preferably used. As the conductive member, for example, aluminum may be used. The thickness of the positive electrode current collector may be, for example, about 5 µm to 30 µm.

The positive electrode mixture layer contains a positive electrode active material. As the positive electrode active material, various materials that are known to be used as the positive electrode active material of a lithium secondary battery may be used without particular limitations. Examples of the positive electrode active material include lithium transition metal compounds that contain lithium and at least one type of transition metal elements. For example, as the positive electrode active material, a lithium transition metal complex oxide containing Li and at least one type among Ni, Co, and Mn is used.

In the positive electrode active material, when the sum of transition metals contained in the positive electrode active material is 100 mol %, the ratio of Mn may be 10 mol % or higher (for example, 30 mol % or higher). Mn has a tendency toward relatively easy elution in a high-temperature environment. Therefore, for example, in a case where the positive electrode active material containing Mn in the above-mentioned proportion is used, the technique described in the specification is preferably applied. That is, in a battery using the positive electrode active material containing the Mn in the above-mentioned proportion, the effect of enhancing the durability (high-temperature storage characteristics) described above is more preferably exhibited.

The properties of the positive electrode active material are not particularly limited, and are typically in the form of particles or powder. The average particle size of the particle-like positive electrode active material may be typically 1 μm to 20 μm (for example, 2 μm to 10 μm). The "average particle size" is referred to as a particle size ($D_{50}$, median diameter) corresponding to a cumulative 50% point from a small particle size side in a volume-based particle size distribution based on a laser diffraction/light scattering method.

The positive electrode mixture layer may contain, in addition to the positive electrode active material, additives such as a conductive material, a binding material (binder), and the like as necessary. As the conductive material, a conductive powder material such as carbon powder or carbon fiber is preferably used. As the carbon powder, various types of carbon black, for example, acetylene black is preferable.

As the binding material, various types of polymer materials may be employed. For example, in a case where the positive electrode mixture layer is formed by using a water-based composition (a composition in which a dispersion medium is water or a mixed solvent that primarily contains water), a water-soluble or water-dispersible polymer material may be used. The water-soluble or water-dispersible polymer material is exemplified by a cellulose-based polymer such as carboxymethyl cellulose (CMC), a fluorine-based resin such as polytetrafluoroethylene (PTFE), and rubbers such as styrene-butadiene rubber (SBR).

In a case where the positive electrode mixture layer is formed by using a solvent-based composition (a composition in which a dispersion medium is primarily an organic solvent), polymer materials including a vinyl halide resin such as polyvinylidene fluoride (PVdF), and polyalkylene oxide such as polyethylene oxide (PEO) may be used. The binding materials may be used singly or in combinations of two or more types thereof. The polymer materials exemplified above may also be used as, as well as the binding material, an additive such as a thickening material or a dispersing material.

It is preferable that the ratio of the positive electrode active material to the entirety of the positive electrode mixture layer is higher than approximately 50 mass % and is approximately 70 mass % to 97 mass % (for example, 75 mass % to 95 mass %). In addition, it is preferable that the ratio of the conductive material to the entirety of the positive electrode mixture layer is approximately 2 mass % to 20 mass % (for example, 3 mass % to 10 mass %). In addition, it is preferable that the ratio of the binding material to the entirety of the positive electrode mixture layer is approximately 0.5 mass % to 10 mass % (for example, 1 mass % to 5 mass %).

A production method of the positive electrode is not particularly limited, and existing methods may be appropriately employed. For example, the following method is employed. First, a slurry-like composition for forming the positive electrode mixture layer is prepared by mixing the positive electrode active material with the conductive material, the binding material, and the like with an appropriate solvent. The mixing operation may be performed by using, for example, an appropriate kneader (planetary mixer or the like). As the solvent, any of a water-based solvent or an organic solvent can be used, and for example, N-methyl-2-pyrrolidone (NMP) may be used. Next, the prepared composition is applied to the positive electrode current collector, and the solvent contained in the composition is removed. The composition applied to the positive electrode current collector may be compressed to have a desired thickness and a coating amount as necessary. In this manner, the positive electrode in which the positive electrode mixture layer is formed on the positive electrode current collector is obtained. As a method of applying the composition to the positive electrode current collector, for example, an appropriate application apparatus such as a die coater may be used. For the removal of the solvent, general drying means (drying with heat or vacuum drying) may be employed.

The coating amount of the positive electrode mixture layer per unit area on the positive electrode current collector (the coating amount of the composition for forming the positive electrode mixture layer in terms of solid content) is not particularly limited, but is preferably 3 mg/cm$^2$ or higher (for example, 10 mg/cm$^2$ or higher, and typically 20 mg/cm$^2$ or higher), and 100 mg/cm$^2$ or lower (for example, 70 mg/cm$^2$ or lower, and typically 50 mg/cm$^2$ or lower) for each surface of the positive electrode current collector from the viewpoint of compatibility between high energy density and high input and output densities.

As the negative electrode current collector included in the negative electrode (for example, the negative electrode sheet) of the lithium secondary battery, as in the related art, a conductive member made of metal having good conductivity is preferably used. As the conductive member, for example, copper may be used. The thickness of the negative electrode current collector may be, for example, about 5 μm to 30 μm.

The negative electrode mixture layer contains a negative electrode active material. As the negative electrode active material, various materials that are known to be used as the negative electrode active material of a lithium secondary battery may be used without particular limitations. An appropriate example of the negative electrode active material includes a carbon-containing material. Representative examples of the carbon-containing material include graphite carbon (graphite) and amorphous carbon. Among the examples, it is preferable to use a carbon-containing material (graphite-based carbon-containing material) that primarily contains graphite. The graphite may be scale-like graphite formed in a spherical shape. In addition, the surface of the graphite may be coated with amorphous carbon.

Among the examples, the carbon-containing material is preferable. The carbon-containing material causes a small change in volume (expansion and contraction) during charging and discharging and thus has excellent durability compared to, for example, oxide such as lithium titanate, or a compound such as a silicon material. Therefore, in a case where the negative electrode active material is the carbon-containing material, the effect of enhancing durability can be exhibited at a higher level. Particularly, the graphite has a hexagonal net structure having an excellent degree of orientation (degree of graphitization). Therefore, the graphite has high energy density among the carbon-containing materials. Therefore, in a case where the negative electrode active material is the graphite, the initial characteristics (for example, energy density) and the durability can be compatible with each other at a higher level. On the other hand, as a counter-effect of the high degree of orientation, the graphite tends to cause side reactions other than charging and discharging. That is, the non-aqueous electrolyte tends to easily undergo reductive decomposition on the surface of the negative electrode active material. Therefore, in the case where the negative electrode active material is the graphite, the application of the invention can exhibit higher effects.

The properties of the negative electrode active material are not particularly limited, and are typically in the form of particles or powder. The BET specific surface area of the particle-like negative electrode active material may be typically 1 $m^2/g$ or higher (typically 2.5 $m^2/g$ or higher, and for example, 2.8 $m^2/g$ or higher), and 10 $m^2/g$ or lower (typically 3.5 $m^2/g$ or lower, and for example, 3.4 $m^2/g$ or lower). In addition, the "BET specific surface area of the active material" is referred to as a value obtained by analyzing the surface area of the active material powder measured by a nitrogen adsorption method using a BET method (for example, a single point BET method).

The negative electrode mixture layer may contain, in addition to the negative electrode active material, additives such as a binding material as necessary. As the binding material, various types of polymer materials may be employed. For example, materials that can be contained in the positive electrode mixture layer may be preferably used for a water-based composition or a solvent-based composition. The binding material may also be used as, as well as the binding material, an additive such as a thickening material or a dispersing material.

It is preferable that the ratio of the negative electrode active material to the entirety of the negative electrode mixture layer is higher than approximately 50 mass % and is approximately 90 mass % to 99 mass % (for example, 95 mass % to 99 mass %, and typically 97 mass % to 99 mass %). In addition, it is preferable that the ratio of the additive to the entirety of the negative electrode mixture layer is approximately 1 mass % to 10 mass % (for example, 1 mass % to 5 mass %, and typically 1 mass % to 3 mass %).

In the lithium secondary battery of this embodiment, the BET specific surface area of the negative electrode mixture layer is 3 $m^2/g$ to 4.3 $m^2/g$. By allowing the BET specific surface area to have a predetermined value or higher, a reaction field that reacts with charge carriers is appropriately ensured, and thus the initial resistance can be sufficiently reduced. As a result, high input and output characteristics can be realized. In addition, by allowing the BET specific surface area to have a predetermined value or lower, reductive decomposition of the non-aqueous electrolyte in the negative electrode is suppressed, and thus an increase in irreversible capacity is suppressed. As a result, a high capacity retention ratio can be realized. Furthermore, according to this embodiment, the surface of the negative electrode mixture layer is covered with an appropriate amount of the SEI film having appropriate quality. As a result, excellent battery characteristics described above can be stably maintained and exhibited over a long period of time. In addition, the BET specific surface area of the negative electrode mixture layer may be adjusted on the basis of, for example, the BET specific surface area of the negative electrode active material.

The BET specific surface area of the negative electrode mixture layer may be obtained, for example, as follows. That is, an appropriate amount of the negative electrode is cut. In a case where the negative electrode is extracted by disassembling the lithium secondary battery, the cut negative electrode is cleaned with a non-aqueous solvent such as ethyl methyl carbonate. Next, the negative electrode mixture layer is extracted from the negative electrode using a spatula or the like, and this is used as a sample. Next, this is subjected to preliminary drying (degassing conditions) at 110° C. for one hour using a specific surface area measuring instrument (for example, "SAP2010" made by Shimadzu Corporation), and the specific surface area thereof is measured by a nitrogen adsorption method (using nitrogen gas as an adsorbate). The obtained specific surface area is analyzed by a BET method (for example, a single point BET method), thereby calculating a BET specific surface area ($m^2/g$). Examples, which will be described later, employ the same method.

A production method of the negative electrode is not particularly limited, and existing methods may be appropriately employed. For example, the following method is employed. First, a slurry-like composition for forming the negative electrode mixture layer is prepared by mixing the negative electrode active material with the binding material and the like with an appropriate solvent. As the solvent, any of an aqueous solvent or an organic solvent can be used, and for example, water may be used. Next, the prepared composition is applied to the negative electrode current collector, the solvent contained in the composition is removed, and the resultant may be compressed (pressed) as necessary. In this manner, the negative electrode in which the negative electrode mixture layer is formed on the negative electrode current collector is obtained. Operations (mixing or application of the composition, removal of the solvent, and the like) during the manufacturing of the negative electrode may be performed in the same manner as in the manufacturing of the positive electrode described above.

The coating amount of the negative electrode mixture layer per unit area on the negative electrode current collector (the coating amount of the composition for forming the negative electrode mixture layer in terms of solid content) is not particularly limited, but is preferably 2 $mg/cm^2$ or higher (for example, 5 $mg/cm^2$ or higher, and typically 10 $mg/cm^2$ or higher), and 50 $mg/cm^2$ or lower (for example, 30 $mg/cm^2$ or lower, and typically 20 $mg/cm^2$ or lower) for each surface of the negative electrode current collector from the viewpoint of compatibility between high energy density and high input and output densities.

The separator (separator sheet) disposed to separate the positive electrode and the negative electrode from each other may be a member which insulates the positive electrode mixture layer and the negative electrode mixture layer from each other and allows movement of the charge carriers. Appropriate examples of the separator include members having a structure with two or more layers of polyethylene (PE), polypropylene (PP), or combinations thereof. In the separator sheet, for example, a heat-resistant layer that primarily contains an inorganic filler may be provided. In a case where a solid (gel-like) non-aqueous electrolyte is used instead of the liquid non-aqueous electrolyte, the non-aqueous electrolyte itself may function as the separator, thus the separator may become unnecessary.

The non-aqueous electrolyte (the non-aqueous electrolyte when accommodated in the battery case) accommodated in the battery case includes lithium sulfate. For example, the lithium sulfate is attracted to the negative electrode during charging and discharging and can be incorporated into the SEI film of the surface of the negative electrode. The lithium sulfate is chemically or electrically decomposed on the surface of the negative electrode, and the decomposed matter can be adhered (adsorbed, or bonded) to the surface of the negative electrode. In this manner, a good-quality SEI film containing components derived from the lithium sulfate is formed on the surface of the negative electrode. The SEI film has low resistance and high durability.

That is, the lithium sulfate contains lithium ions which are the charge carriers of the lithium secondary battery. Therefore, there is an effect of increasing the amount of lithium being present in the SEI film. As a result, the concentration of the charge carriers in the vicinity of the negative electrode is increased, and thus insertion and separation of the charge carriers during charging and discharging are more smoothly performed. That is, the SEI film having low resistance can be formed on the surface of the negative electrode. Therefore, excellent battery characteristics (for example, high input and output characteristics) can be realized.

In addition, the lithium sulfate has sulfate ions ($SO_4^{2-}$). The sulfate ions has a single sulfur atom (S) and four oxygen atoms (O), and two oxo groups (=O) and two oxy groups (—O—) are bonded to the S. The components derived from the lithium sulfate are strongly adhered (adsorbed or bonded) to the surface of the negative electrode through the structure. As a result, for example, compared to a case where an existing additive that does not have sulfate ions is used, the SEI film having high durability can be formed on the surface of the negative electrode. In other words, the SEI film on the surface of the negative electrode can be stably maintained over a long period of time. In addition, the lithium sulfate does not include halogens such as fluorine atoms, which may lead to an increase in the resistance of the SEI film. Therefore, for example, compared to a case where the additive as described in JP 2011-187440 A is used, an increase in the resistance of the SEI film after a long-term use can be suppressed. Therefore, according to this embodiment, even after continuous use over a long period of time, for example, over 10 years without replacement, excellent long-term durability (for example, high capacity retention ratio or low resistance) can be realized. This mechanism is not clear, but it is assumed that an increase in resistance is suppressed, for example, due to electron withdrawing inductive effect, structural stability, and the like based on the sulfate ions.

As the lithium sulfate, commercially available materials may be used without particular limitations. As an example, lithium sulfate powder for industrial use, an aqueous solution of lithium sulfate, or the like may be employed. Specifically, an anhydride of the lithium sulfate, a hydrate ($Li_2SO_4 \cdot nH_2O$) containing water of crystallization, or the like is exemplified.

In this embodiment, the addition amount of the lithium sulfate is determined according to the properties (for example, BET specific surface area) of the negative electrode mixture layer. That is, in a case where the BET specific surface area of the negative electrode mixture layer is 3 $m^2/g$ to 4.3 $m^2/g$, the ratio (addition amount) of the lithium sulfate is 0.02 mass % or higher (for example, 0.03 mass % or higher) when the total amount of the non-aqueous electrolyte accommodated in the battery case is 100 mass %. By allowing the addition amount to have a predetermined value or higher, the lithium sulfate components are sufficiently contained in the SEI film of the surface of the negative electrode. As a result, the effect of adding the lithium sulfate is sufficiently exhibited, an increase in resistance, for example, during high-temperature storage is suppressed at a higher level, and thus durability can be appropriately enhanced. In addition, the upper limit of the ratio (addition amount) of the lithium sulfate is determined, for example, in consideration of the solubility to a non-aqueous solvent and the properties (for example, BET specific surface area) of the negative electrode mixture layer. That is, in a case where the BET specific surface area of the negative electrode mixture layer is 3 $m^2/g$ to 4.3 $m^2/g$, the ratio (addition amount) of the lithium sulfate is 0.1 mass % or lower (for example, 0.08 mass % or lower) when the total amount of the non-aqueous electrolyte accommodated in the battery case is 100 mass %. By allowing the addition amount to have a predetermined value or lower, an increase in resistance caused by excessive addition of the lithium sulfate can be highly suppressed. In addition, a non-aqueous electrolyte which is less likely to cause problems such as precipitation and is thus homogeneous can be realized.

Moreover, in this embodiment, when the BET specific surface area of the negative electrode mixture layer per unit mass is referred to as X ($m^2/g$) and the addition amount of the lithium sulfate to the total amount of the non-aqueous electrolyte accommodated in the battery case is referred to as Y (mass %), the following expression: (Y/X)≤0.023 is satisfied. In other words, the addition amount of the lithium sulfate per BET specific surface area of the negative electrode mixture layer is allowed to have a predetermined value or lower. Accordingly, excessive formation of a film on the surface of the negative electrode mixture layer is suppressed. As a result, an increase in resistance caused by excessive addition of the lithium sulfate is suppressed.

The X and the Y may satisfy the following expression: Y≤0.0538X−0.1315. Accordingly, the enhancement of the durability (for example, the suppression of an increase in resistance during high-temperature storage) and other battery characteristics (the capacity retention ratio and initial resistance) can be compatible with each other at a higher level. In addition, the X and the Y may satisfy the following expression: Y≥0.0462X−0.1185. Accordingly, the effects of the invention can be exhibited at a higher level.

The non-aqueous electrolyte accommodated in the battery case typically contains, in addition to the lithium sulfate, a non-aqueous solvent and a support salt. As a specific example, a non-aqueous electrolytic solution in which lithium sulfate and a support salt are contained in an appropriate non-aqueous solvent may be employed. The non-aqueous electrolytic solution is in a liquid state at room temperature (for example, 25° C.). In a preferable aspect, the non-aqueous electrolytic solution is always in a liquid state in a use environment of the battery (for example, in an environment at a temperature of −20° C. to +60° C.).

As the support salt, various materials that are known to be used as a support salt (lithium salt) of the non-aqueous electrolyte of a lithium secondary battery may be used without particular limitations. Appropriate examples of the support salt include $LiPF_6$, $LiBF_4$, $LiAsF_6$, $LiCF_3SO_3$, $LiC_4F_9SO_3$, $Li(CF_3SO_2)_2N$, $LiC(CF_3SO_2)_3$, $LiSiF_6$, and $LiClO_4$. These materials may be used singly or in combinations of two or more types thereof. Among the materials, $LiPF_6$ or $LiBF_4$ is preferable. The concentration of the support salt in the non-aqueous electrolyte accommodated in the battery case may be appropriately set on the basis of general technical knowledge of those skilled in the art. It is preferable that the concentration thereof is approximately 0.1 mol/L to 5 mol/L (for example, 0.5 mol/L to 3 mol/L, and typically, 0.8 mol/L to 1.5 mol/L).

As the non-aqueous solvent, various types of organic solvents that are used for the non-aqueous electrolyte of a general lithium secondary battery, such as carbonates, ethers, esters, nitriles, sulfones, and lactones may be used. Examples thereof include ethylene carbonate (EC), propylene carbonate (PC), diethyl carbonate (DEC), dimethyl carbonate (DMC), and ethyl methyl carbonate (EMC), vinylene carbonate, 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, and fluorinated compounds thereof (for example, fluorinated carbonates such as monofluoroethylene carbonate and difluoroethylene carbonate). These materials may be used singly or in combinations of two or more types thereof.

An appropriate example of the non-aqueous solvent includes a carbonate-based solvent. The carbonate-based solvent is referred to as a non-aqueous solvent in which the volume of the sum of carbonates occupies 60 vol % or more (more preferably 75 vol % or more, even more preferably 90 vol % or more, and substantially 100 vol %) with respect to the volume of the entirety of the non-aqueous solvent. In the configuration including the carbonate-based solvent and the above-described lithium sulfate, an SEI film having further reduced resistance can be formed on the surface of the negative electrode. Therefore, the effects of the invention can be exhibited even more preferably.

As the carbonates, a combined system of cyclic carbonate and chain carbonate is preferable from the viewpoint of electrical conductivity and electrochemical stability. For example, it is preferable that the mixing ratio of the cyclic carbonate and the chain carbonate is in a range of 20:80 to 40:60 in terms of volume. As the cyclic carbonate, EC and PC are preferable, and EC is particularly preferable. As the chain carbonate, DEC, DMC, and EMC are preferable, and DMC and EMC are particularly preferable. In a case where DMC and/or EMC are used as the chain carbonate, the mixing ratio between DMC and EMC is 0:100 to 100:0, preferably 20:80 to 80:20 (for example, 40:60 to 70:30, and typically 50:50 to 65:35) in terms of volume.

The non-aqueous electrolyte accommodated in the battery case may contain arbitrary additives as necessary within limits that do not damage the effects of the invention. The additives may be used for one or two or more purposes such as the enhancement of the input and output characteristics of the battery, the enhancement of storage characteristics, the enhancement of cycle characteristics, the enhancement of initial charging and discharging efficiency, and the like. Preferable examples of the additives include so-called film forming agents such as fluorophosphates (preferably, difluorophosphate, for example, lithium difluorophosphate expressed as $LiPO_2F_2$) and lithium bis(oxalato)borate (LiBOB). For example, additives such as cyclohexylbenzene and biphenyl, which can be used as a countermeasure against overcharging may also be used.

After a battery assembly is produced by accommodating the positive electrode, the negative electrode, and the non-aqueous electrolyte described above in the battery case, typically, the battery assembly is charged (conditioned) to a predetermined voltage. A charging voltage may be set to allow, for example, at least one type of non-aqueous solvents to be electrically decomposed. As an example, in a case where the negative electrode active material is a carbon-containing material and the non-aqueous solvent is a carbonate-based solvent, charging may be performed to allow a voltage between the positive and negative electrode terminals to be approximately 3.5 V or higher, for example, to reach 4 V to 4.2 V. The charging may be performed in a method (CC charging) in which constant-current charging is performed until the battery voltage reaches a predetermined value after the start of the charging, and may also be performed in a method (CC-CV charging) in which constant-voltage charging is performed after the predetermined voltage is reached. In addition, a charging rate during the constant-current charging is typically 1 C or lower, and preferably 0.1 C to 0.2 C. According to the investigations by the inventors, when charging is performed at a low rate of 1 C or lower, a portion of the non-aqueous electrolyte (for example, the non-aqueous solvent or the lithium sulfate) is electrically decomposed relatively smoothly. In addition, the SEI film containing the components of the non-aqueous electrolyte is formed on the surface of the negative electrode with appropriate denseness (for example, to achieve low resistance and sufficient suppression of reactivity with the non-aqueous electrolyte). Therefore, the effects of the invention can be exhibited at a higher level. The charging may be performed once, or may also be repeated two or more times with discharging performed therebetween.

After the charging process, the battery assembly may be held (aged) for a predetermined period in an environment at a high temperature of 40° C. or higher (for example, 40° C. to 60° C.). As an apparatus for increasing the temperature of the battery assembly and holding the temperature, for example, a temperature-controlled thermostatic bath, an infrared heater, or the like may be used. In addition, the charged state (State of Charge) of the battery while being held at a high temperature may be typically SOC70% or higher (preferably SOC80% or higher, for example, SOC80% to SOC100%, and more preferably SOC90% or higher). A time for holding the battery assembly at a high temperature (aging time) is dependent on, for example, the holding temperature, the charged state, the configuration of the non-aqueous electrolyte, and the like and is not particularly limited. As an appropriate example, a cumulative time from the start of the temperature increase may be approximately 10 hours to 48 hours (for example, about 24 hours). According to the investigations by the inventors, by holding the battery for a predetermined period of time at a high SOC and a high temperature, the growth of a film formed on the surface of the negative electrode is accelerated during the charging. As a result, for example, compared to a case where the battery is held at a low SOC or at a temperature of lower than room temperature, or compared to a battery which is not subjected to aging, the effect of adding the lithium sulfate is more appropriately exhibited. Therefore, the effect of reducing resistance and the effect of enhancing durability described above are realized at a higher level.

According to this embodiment, the lithium secondary battery including the positive electrode that includes the positive electrode active material, the negative electrode that includes the negative electrode active material, and the battery case that accommodates the positive electrode and the negative electrode is provided. In the lithium secondary battery, the non-aqueous electrolyte is accommodated inside the battery case. The non-aqueous electrolyte may contain the lithium sulfate. In addition, the good-quality SEI film containing the components derived from the lithium sulfate is formed on at least the surface of the negative electrode. Accordingly, the initial characteristics and the durability of the battery are compatible with each other with a good balance. As a result, significant effects that the initial battery characteristics are high and an increase in resistance and a reduction in capacity retention ratio are suppressed even after continuous use for a long period of time.

The absence or presence of the components derived from the lithium sulfate can be checked, for example, as follows. For example, in a case of evaluating the non-aqueous electrolyte, the upper surface of the battery case is bored, and the non-aqueous electrolyte is extracted therefrom and is used as a measurement sample. For example, in a case where the SEI film of the surface of the negative electrode is evaluated, the negative electrode is extracted and is immersed in an appropriate solvent (for example, a 50% acetonitrile aqueous solution) for a predetermined time. Accordingly, film components (for example, $Li^+$, and groups containing an S atom, such as $S(=O)_2^{2-}$, $SO_3^-$, and $SO_4^{2-}$) in the solvent are extracted and used as measurement samples. Next, the measurement samples are provided for well-known measurement such as ion chromatography (IC), gas chromatography-mass spectrometry (GC-MS), liquid chromatography-mass spectrometry (LC-MS), X-ray absorption fine structure (XAFS), and inductively coupled plasma-atomic emission spectrometry (ICP-AES). Through these measurements, qualitative and quantitative determination of the film components can be performed. In addition, these measurement methods may be appropriately selected, for example, according to the types of elements as measurement objects.

The lithium secondary battery of this embodiment can be used for various purposes. However, due to the effect of adding the lithium sulfate to the non-aqueous electrolyte, the initial resistance thereof is low, and the battery characteristics are appropriately held. Therefore, in the lithium secondary battery of this embodiment, high input and output characteristics are held over a long period of time, and excellent durability can be realized. The lithium secondary battery can be preferably used as a drive source (drive power source) for a motor mounted in a vehicle such as a hybrid vehicle (HV), a plug-in hybrid vehicle (PHV), or an electric vehicle (EV). Therefore, according to the invention, a vehicle in which the lithium secondary battery (may be in the form of an assembled battery in which a plurality of batteries are connected) of this embodiment is mounted is provided.

Next, several examples related to the invention are described, and are not intended to limit the invention to the examples.

[Production of Positive Electrode]

$LiNi_{0.33}Co_{0.33}Mn_{0.33}O_2$ as a positive electrode active material, acetylene black (AB) as a conductive material, and polyvinylidene fluoride (PVdF) as a binding material were mixed by using N-methyl-2-pyrrolidone (NMP) to allow the mass ratio of the materials to be 90:8:2, thereby preparing a slurry-like composition for forming a positive electrode mixture layer. The composition was applied to both surfaces of an aluminum foil (with a thickness of 15 μm) to achieve a coating amount of 30 mg/cm$^2$ (in terms of solid content) for each of the surfaces. A positive electrode sheet in which the positive electrode mixture layer was provided on both surfaces of a positive electrode current collector was produced by drying and pressing the applied composition.

[Production of Negative Electrode]

Natural graphite powder as a negative electrode active material, styrene-butadiene rubber (SBR) as a binding material, and carboxymethyl cellulose (CMC) as a dispersing material were mixed by using ion-exchange water to allow the mass ratio of the materials to be 98:1:1, thereby preparing a slurry-like composition for forming a negative electrode mixture layer. The composition was applied to both surfaces of a copper foil (with a thickness of 10 μm) to achieve a coating amount of 15 mg/cm$^2$ for each of the surfaces. A negative electrode sheet in which the negative electrode mixture layer was provided on both surfaces of a negative electrode current collector was produced by drying and pressing the applied composition. In addition, the BET specific surface area X (m$^2$/g) of the negative electrode mixture layer according to each example was controlled by using negative electrode active materials having different BET specific surface areas to achieve values shown in Table 1.

[Production of Lithium Secondary Battery]

Figure 2:
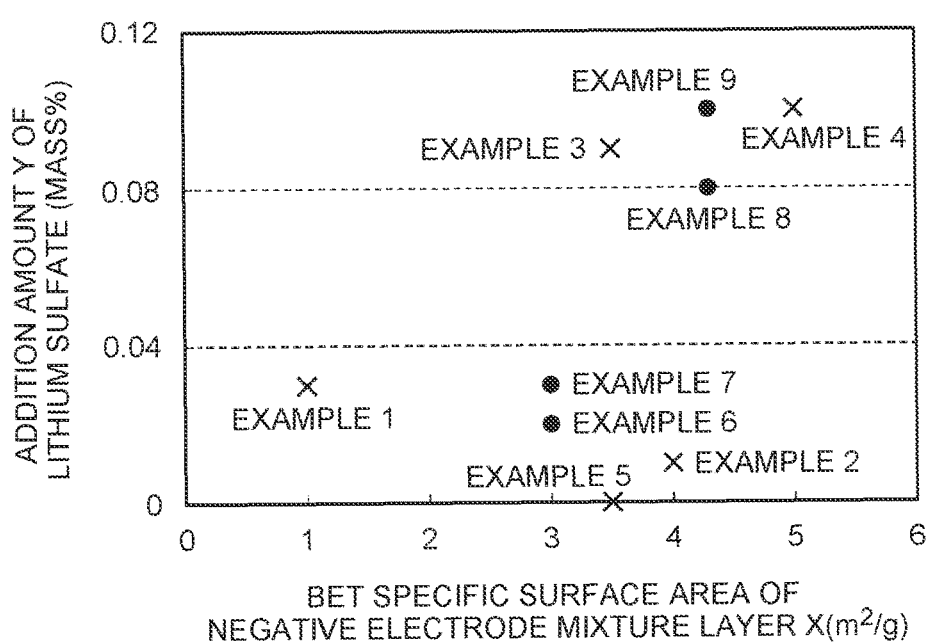
FIG. 2 is a graph showing the BET specific surface area of a negative electrode mixture layer and the addition amount of lithium sulfate in test examples.

The positive electrode sheet and the negative electrode sheet produced as above were wound together with two sheets of separators, thereby producing a wound electrode body. As the separator sheet, a sheet having a three-layer structure (PP/PE/PP) in which a polypropylene (PP) layer was laminated on both surfaces of a polyethylene (PE) layer was used. Electrode terminals were joined to the end portions of positive and negative electrode current collectors of the wound electrode body, and were accommodated in an aluminum battery case. Next, by injecting and sealing a non-aqueous electrolytic solution, a 18650-type cylindrical battery assembly was constructed. As the non-aqueous electrolytic solution, a solution obtained by dissolving $LiPF_6$ as a support salt at a concentration of 1.1 mol/L in a mixed solvent of ethylene carbonate (EC), dimethyl carbonate (DMC), and ethyl methyl carbonate (EMC) at a volume ratio of EC:DMC:EMC=30:40:30 and further adding lithium sulfate expressed in the above expression (II) as lithium sulfate in an addition amount Y (mass %) shown in Table 1 was used. In FIG. 2, the BET specific surface area of the negative electrode mixture layer and the addition amount of the lithium sulfate in test examples are shown.

The constructed battery assembly was subjected to CC charging (conditioning) at a constant current of 0.1 C until the terminal voltage between the positive and negative electrodes had reached 4.1 V. Next, the battery assembly after the conditioning was adjusted to SOC90% and was then installed in a temperature-controlled thermostatic bath, and the temperature was increased to 40° C. In addition, while maintaining the SOC90% state, the battery assembly was held at a high temperature of 40° C. until a time elapsed from the start of the temperature increase reached 24 hours (aging). Accordingly, a lithium secondary battery according to each example was produced.

[Measurement of Initial Capacity]

Regarding the lithium secondary battery after the above-described pre-treatment, the initial capacity was measured at a temperature of 25° C. in the following procedures 1 to 3. (Procedure 1) After 3.0 V was reached through constant-current discharging at 1/3 C, discharging was performed through constant-voltage discharging for 2 hours, and thereafter the lithium secondary battery was disconnected for 10 minutes. (Procedure 2) After 4.1 V was reached through constant-current charging at 1/3 C, constant-voltage charging was performed until the current had reached 1/100 C, and thereafter the lithium secondary battery was disconnected for 10 minutes. (Procedure 3) After 3.0 V was reached through constant-current discharging at 1/3 C, constant-voltage discharging was performed until the current had reached 1/100 C, and thereafter the lithium secondary battery was disconnected for 10 minutes. In addition, the discharge capacity (CCCV discharge capacity) in Procedure 3 was used as the initial capacity.

[Measurement of Initial Resistance (IV Resistance)]

The lithium secondary battery according to each example was adjusted to a state in which the SOC was 60% at a temperature of 25° C. Each battery adjusted to SOC60% was subjected to CC discharging at a rate of 10 C for 10 seconds, and a voltage drop in the meantime was measured. The measured amount of the voltage drop was divided by the current value during the CC discharging, such that the IV resistance (mΩ) was calculated and used as the initial resistance. The results are shown in Table 1.

[High-Temperature Storage Test]

The lithium secondary battery according to each example was adjusted to a state in which the SOC was 85% at a temperature of 25° C. Each battery adjusted to SOC85% was stored in a thermostatic bath at a temperature of 60° C. for 30 days. After the test, the battery was taken out of the thermostatic bath, and the battery capacity and the IV resistance were measured at a temperature of 25° C. in the same manner as in the initial case. The measurement value after the high-temperature storage test was divided by the initial value, such that the capacity retention ratio (%) and a resistance increase ratio (%) were calculated. The results are shown in Table 1.

TABLE 1

|  | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Addition amount Y of lithium sulfate (mass %) | 0.03 | 0.01 | 0.09 | 0.1 | 0 | 0.02 | 0.1 | 0.03 | 0.08 |
| BET specific surface area of negative electrode mixture layer ($m^2/g$) | 1 | 4 | 3.5 | 5 | 3.5 | 3 | 4.3 | 3 | 4.3 |
| Y/X | 0.030 | 0.003 | 0.026 | 0.020 | 0 | 0.007 | 0.023 | 0.010 | 0.019 |
| Resistance increase ratio (%) | 104 | 125 | 121 | 104 | 131 | 104 | 103 | 103 | 105 |
| Capacity retention ratio (%) | 95 | 94 | 93 | 83 | 92 | 92 | 90 | 93 | 91 |
| Initial resistance (mΩ) | 82 | 25 | 23 | 24 | 32 | 24 | 21 | 21 | 23 |

As shown in Table 1, in Examples 2 and 5 in which the addition amount of lithium sulfate was less than 0.02 mass %, a significant increase in resistance after the high-temperature storage was confirmed. That is, in a case where the absolute amount of the added lithium sulfate is too low with respect to the BET specific surface area of the negative electrode mixture layer, the effects of the invention may be diluted. On the other hand, the non-aqueous electrolytic solution used at this time encountered the solubility limit when the addition amount of the lithium sulfate was near and above 0.1 mass %. That is, by allowing the addition amount of the lithium sulfate to be equal to or lower than the solubility, a more homogeneous non-aqueous electrolyte can be maintained. In addition, in Example 1 in which the BET specific surface area of the negative electrode mixture layer was 1 $m^2/g$, an initial resistance, which was three to four or more times higher than in other examples was exhibited. That is, in a case where the BET specific surface area of the negative electrode mixture layer is too low, there is a tendency toward an increase in the initial resistance. On the other hand, in Example 4 in which the BET specific surface area of the negative electrode mixture layer was 5 $m^2/g$, the capacity retention ratio after the high-temperature storage was reduced. That is, in a case where the BET specific surface area of the negative electrode mixture layer is too high, there is a tendency toward the deterioration of the capacity retention ratio. In addition, even in Example 3 in which the ratio (Y/X) of the addition amount Y of the lithium sulfate to the BET specific surface area X of the negative electrode mixture layer was higher than 0.023, the resistance increase ratio after the high-temperature storage showed a high value. That is, in a case where the addition amount of the lithium sulfate is too high with respect to the BET specific surface area of the negative electrode mixture layer, the amount of a film formed per unit specific surface area of the negative electrode mixture layer may become high (the film becomes thick). Otherwise, residues from the lithium sulfate may cause side reactions, and the quality of the SEI film may be degraded. Therefore, the effects of the invention may be weakened. Contrary to this, in Examples 6 to 9, the initial resistance was suppressed to be low, the capacity retention ratio after the high-temperature storage was excellent, and an increase in resistance during the high-temperature storage was suppressed.

From the above results, an increase in resistance during the high-temperature storage is suppressed by adding the lithium sulfate to the non-aqueous electrolyte. In addition, by setting the BET specific surface area X of the negative electrode mixture layer, the addition amount Y of the lithium sulfate, and the ratio (Y/X) therebetween to be in predetermined ranges, the initial resistance was sufficiently suppressed, and excellent durability (the maintenance of the capacity retention ratio and the suppression of an increase in resistance) is realized. Due to such effects, the lithium secondary battery capable of maintaining and exhibiting good battery characteristics (for example, input and output characteristics) over a long period of time (having high durability) is realized.

While the specific examples of the invention have been described in detail, there are merely examples.

What is claimed is:

1. A manufacturing method of a lithium secondary battery comprising:

a process of preparing a positive electrode which includes a positive electrode mixture layer, a negative electrode which includes a negative electrode mixture layer, and a non-aqueous electrolyte; and a process of accommodating the positive electrode, the negative electrode, and the non-aqueous electrolyte in a battery case, wherein the non-aqueous electrolyte contains lithium sulfate, and when a BET specific surface area of the negative electrode mixture layer is referred to as X $m^2/g$ and an addition amount of the lithium sulfate with respect to a total amount of the non-aqueous electrolyte is referred to as Y mass %, the following relationships are satisfied:

$3 \leq X \leq 4.3$;

$0.02 \leq Y \leq 0.1$; and $Y/X \leq 0.023$.

2. The manufacturing method according to claim 1, wherein
the negative electrode mixture layer includes a negative electrode active material, and the negative electrode active material is graphite.

3. A lithium secondary battery comprising:
a positive electrode which includes a positive electrode mixture layer;
a negative electrode which includes a negative electrode mixture layer;
a battery case which accommodates the positive electrode and the negative electrode; and
a non-aqueous electrolyte which is accommodated in the battery case,
wherein the non-aqueous electrolyte contains lithium sulfate, and
when a BET specific surface area of the negative electrode mixture layer is referred to as X m$^2$/g and an addition amount of the lithium sulfate with respect to a total amount of the non-aqueous electrolyte accommodated in the battery case is referred to as Y mass %, the following relationships are satisfied:

$3 \leq X \leq 4.3$;

$0.02 \leq Y \leq 0.1$; and $Y/X \leq 0.023$.

4. The lithium secondary battery according to claim 3, wherein
the negative electrode mixture layer includes a negative electrode active material, and the negative electrode active material is graphite.

* * * * *